United States Patent
Hoyer et al.

[15] 3,682,019
[45] Aug. 8, 1972

[54] METHOD OF AND DEVICE FOR CONTROLLING A MULTI-STAGE CHANGE GEAR TRANSMISSION

[72] Inventors: Manfred Hoyer, Bergisch Gladbach-Schildgen; Helmut Welke; Johann Ubban, both of Cologne, all of Germany

[73] Assignee: Klockner-Humboldt Aktiengesellschaft, Cologne-Deutz, Germany

[22] Filed: Oct. 12, 1970

[21] Appl. No.: 79,989

[30] Foreign Application Priority Data

Oct. 11, 1969 Germany..........P 19 51 428.4

[52] U.S. Cl. ........................74/745, 74/344, 74/360
[51] Int. Cl............F16h 3/02, F16h 3/34, F16h 3/08
[58] Field of Search........74/342, 360, 740, 745, 359; 574/344

[56] References Cited

UNITED STATES PATENTS

| | | | |
|---|---|---|---|
| 2,920,504 | 1/1960 | Sommer | 74/745 |
| 3,171,300 | 3/1965 | Perkins et al. | 74/745 |
| 3,357,276 | 12/1967 | Vavulo et al. | 74/740 |
| 3,433,101 | 3/1969 | Scholl et al. | 74/866 |
| 3,448,640 | 6/1969 | Nelson | 74/866 |
| 3,537,335 | 11/1970 | Ezpeleta | 74/867 |

*Primary Examiner*—Arthur T. McKeon
*Attorney*—Walter Becker

[57] ABSTRACT

A multi-stage change gear transmission having a main group of gear sets which can be made selectively effective and serially arranged therewith is a power flow stage consisting of parallel flow paths of respectively different transmission ratios and each including a friction clutch with the clutches adapted to be made alternately effective. The clutches provide for subdivision of the change in drive ratio when shifting from one gear set to the next. Also disclosed are control systems for controlling the gear sets and the friction clutches.

16 Claims, 3 Drawing Figures

METHOD OF AND DEVICE FOR CONTROLLING A MULTI-STAGE CHANGE GEAR TRANSMISSION

The present invention relates to a control for multistage change gear transmissions with a main shiftable group and a group shiftable under load and either preceding or following said main shiftable group, said group which is shiftable under load having at least two control steps while the difference between said steps is considerably less, for instance one-half of the difference between the steps in the main shiftable group.

Agricultural trailers with a change gear transmission of the above mentioned type have become known in which the group shiftable under load includes an additional reversing group which can selectively mechanically be made effective. For controlling the main shiftable group and the group shiftable under load, there is for each group provided a control lever as actuating member while for the selective engagement of the reversing group a third control lever serves as actuating member. For reasons of cost, with a change gear transmission of the above mentioned type, the shiftable group which is not shiftable under load is provided with a lower number of stages. As a result thereof, particularly when driving over roads and when pulling a trailer, a rather jerky driving operation is encountered and the shifting is rather difficult when a shifting is effected from one stage to the next following stage of the main shiftable group. This fact which is due to the considerable difference in the successive steps is particularly disturbing when a tractor has to be employed with a high output or pulling power. While the driver of such tractor has the possibility when intending to drive over roads, prior to starting his drive to shift the group shiftable under load to its lowest control stage and to start driving in the lowest control stage of the main shiftable group. Subsequently, the driver would have the possibility to subdivide the next control stage of the main shiftable group by shifting over from the lowest control stage to the stepped-up control stage of the group shiftable under load. In such an instance, however, he would have to change over from the shifting lever pertaining to the main shiftable group to the shifting lever of the group shiftable under load. If the tractor driver intends to shift from this intermediate stage to the transmission-wise next stage of the main shiftable group, he will have to face the problem that simultaneously with the control lever of the main shiftable group he has to shift the next higher control stage and simultaneously has to shift by means of the control lever pertaining to the shiftable group shiftable under load from the stepped-up stage to the lowest stage. This, however, is not possible since the driver during the shifting operation also has to steer the tractor and furthermore has to watch the traffic. Such transmission therefore can be considered only a partial solution to the problem involved, inasmuch as the handling of such transmission, especially when driving tractors with high pulling power, is not suitable.

It is, therefore, an object of the present invention to improve the control of a transmission of the above mentioned general type in such a way that at least when shifting the transmission upwardly, small steps of progression are obtained while simultaneously the driver is relieved to such an extent that his main attention can be devoted to the traffic. Accordingly, in conformity with another object of the invention, the arrangement should be such that the driver will have to actuate one control lever only for controlling the small steps of progression.

These and other objects and advantages of the invention will appear more clearly from the following specification, in connection with the accompanying drawings, in which:

FIG. 1 diagrammatically illustrates a control device according to the invention, in which the control lever of the main shiftable group and the control lever of the group shiftable under load are coupled to each other.

Figure 1:
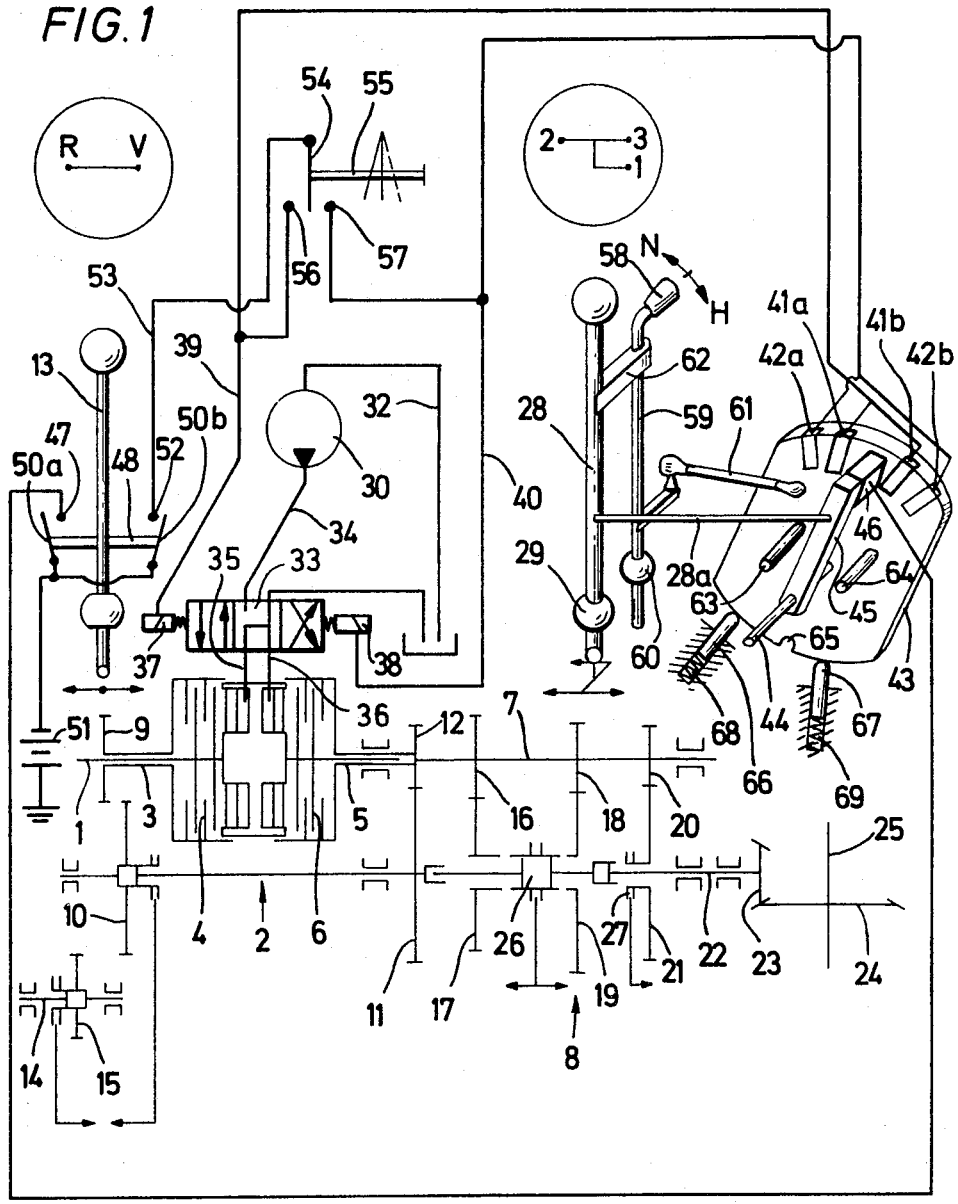

The control system according to the present invention is characterized primarily in that when initiating the shifting operation from one control stage to the adjacent control stage of the main shiftable group by the control member pertaining thereto, the step of progression of said main shiftable group is automatically subdivided by a stage of the group shiftable under load while when shifting through to the adjacent control stage of the main shiftable group, the interposed control stage will be made ineffective.

According to a further development of the invention, it is provided that the actuating members and the control members of the transmission are so combined with each other that when shifting from one stage to an adjacent stage of the main shiftable group, the actuating member of the group shiftable under load is automatically moved in the control position for subdividing the step of progression of the main shiftable group while when shifting from the interposed control stage to the adjacent control stage of the main shiftable group, the interposed control stage is automatically made ineffective.

In this connection, it is furthermore expedient so to combine the actuating members and the control members of the transmission that when shifting from one control stage to the adjacent control stage of the main shiftable group, the actuating member of the shiftable group shiftable under load will, by the actuating member of the main shiftable group automatically be moved into the control position for subdividing the step of progression of the main shiftable group while when shifting from the intermediate control stage to the next adjacent control stage of the main control group, the actuating member of the control group shiftable under load will, by means of the actuating member of the main shiftable group, be moved automatically into the starting position at the time of the starting of the control operation.

With a change gear transmission in which the actuating member of the main control group is in the form of a pivotable control lever and in which the control of the group shiftable under load is effected by pressure fluid operable clutches and/or brakes, the fluid pressure supply and discharge of which is controlled by a multiway valve, it is suggested according to the present invention that the multi-way valve includes an electromagnetically operable control spool, the magnetic spools of which are operatively connected to the make-and-break contacts of a switch connected to a voltage source while the control lever of the main control group is coupled to the displaceable or pivotable contact maker of the switch. This brings about that with a genuine one-lever control the gear change transmission is shiftable in small steps of progression. If, with such a change gear transmission, the actuating member of the group shiftable under load forms a control rod with a manually operable lever, which control rod is pivotable about its longitudinal central axis, it is suggested in conformity with the invention, for purposes of further facilitating the control, that the control lever of the main control group is coupled to the control rod of the group shiftable under load, and that the control rod is journalled about a shaft which is parallel to the pivot axis of the control lever and is coupled to a displaceable and pivotable contact carrier of the switch, said contact maker being adapted to be displaced by the control lever relative to the contact carrier.

If, with such change gear transmissions, the control group shiftable under load should have a mechanically engageable additional reversing group while the control of the change in the driving direction is effected by multi-way valves, it is intended for the driving change adapted to be effected under load, to provide preferable a two-pole switch reverser for the driving change effectable under load. This reverser or reversing switch is to be provided in the circuit between the magnetic coils of the multi-way valve and the switch which is coupled to the control lever of the main shiftable group. A further facilitation of the operation of the change gear transmission is obtained particularly for the selective loading and street operation by the fact that in the circuit between the reversing switch and a voltage source there is interposed a reversing or selector switch, the contactor of which is coupled to a shift lever which serves for engaging and disengaging the reversing group.

According to the invention, with a change gear transmission in which the actuating member of the main shiftable group is formed by a shiftable control lever, and in which the shifting of the group shiftable under load is effected by fluid pressure operable clutches and/or brakes, while the pressure fluid supply and discharge is controlled by a multi-way valve, the control system according to the present invention is characterized in that the multi-way valve has an electromagnetically operable control valve, the magnetic spools of which, are each controlled by a relay, and is furthermore characterized in that each step of progression of the main shiftable group has a control member associated therewith which controls the control circuit for the relays and the contacts of which when initiating control operations are alternately closed and opened. Such a device for practicing the method according to the invention has the advantage that the control lever of the main shiftable group and the control members controlling the relays can together with the relays easily be combined to a unit. The control members controlling the circuit of the relays are expediently formed by two one-pole switches each, the contacts of which are alternately closed and opened.

A simple control of the control group shiftable under load is realized when a preferably one-pole reversing switch operable by a control lever, or the like, is arranged in the control circuit of the relays governing the magnetic coils of the multi-way valve. The reversing valve is, through a relay, in operative connection with a voltage source, the control circuit of which, is controlled by a switch-on member preferably arranged on the control lever of the main shiftable group. The switch-on member on the control lever preferably forms a one-pole selector switch.

Referring now to the drawings in detail, the arrangement shown therein comprises a driving shaft 1 pertaining to a preceding group 2 shiftable under load and pertaining to the change gear transmission. The drive shaft 1 has one end journalled in the primary part 3 of a pressure fluid operable disc clutch 4 while its other end is journalled in the primary part 5 of an adjacent pressure fluid operable disc clutch 6 through which in the direct control stage, the drive shaft 1 drives the drive shaft 7 of a main control group 8 equipped with mechanically disengageable and engageable control stages. In the gear control stage of the preceding control group, the main control group 8 is driven by the drive shaft 1 through the disc clutch 4, the primary part 3 thereof and a gear 9 non-rotatably connected to said primary part 3, and further, through counter gears 10, 11 and a gear 12 which is non-rotatably connected to the primary part 5 of clutch 6. The group 2 shiftable under load is furthermore provided with a reversing group which is selectively engageable by a control lever 13 and which comprises a gear 15 axially displaceably mounted on a reversing shaft 14, and a gear 10 axially displaceably mounted on a counter shaft, and gear 9. The connection between the control lever 13, the shift coulisse of which, is diagrammatically illustrated above said lever 13, and the reversing group is so designed that when pivoting the control lever 13 in clockwise direction, only gear 10 is engaged with the gear 9. By pivoting the control lever 13 in counter-clockwise direction which is to be effected in a direction counter to the driving direction, the gears 10, 15 are displaced relative to each other in such a way that the drive of the drive shaft 7 from gear 9 is effected through the gear 15 reversing the direction of rotation and the gear 10.

The main control group 8 comprises gear pairs 16, 17 and 18, 19, and 20, 21. The gears 16, 18 and 20 are non-rotatably connected to the drive shaft 7, and the gears 17, 19 and 21 are freely rotatable on an output shaft 22 by which through the intervention of a bevel gear 23, the bevel gear 24 of an axle drive shaft 25 is driven. Between the two gears 17, 19 there is provided a jaw clutch 26 which is non-rotatably but axially displaceably mounted on the output shaft 22. This jaw clutch 26 serves for selective coupling of the output shaft 22 to the gear 17, 19. Furthermore, between the gears 19 and 21, a clutch part is non-rotatably and non-axially displaceably mounted on output shaft 22. This clutch part is adapted to be coupled with the clutch part 27 by a displacement of the gear 21. The control of the three possible control stages of the main control group 8 is effected by a control lever 28 indicated above the change gear transmission, said lever 28 being journalled in a universal joint 29. Pivoting the control lever 28 from its illustrated neutral position into the indicated control path 1 of a control coulisse brings about that through the intervention of non-illustrated control rods or shift forks the output shaft 22 will be coupled to the gear 21. When pivoting the control lever 28 into the control path 2 of the coulisse, however, the gear 19 is coupled to the output shaft 22. The pivoting of the control lever 28 from the illustrated neutral position into the control position 3 brings about that the gear 17 will be coupled to the output shaft 22. The step of progression between the direct control stage of the preceding group 2 and the geared control stage thereof is so designed that it corresponds to about half the step of progression between two adjacent control stages of the main control group 8.

The control of the pressure fluid to and from clutches 4, 6 is effected by a multi-way valve 33, said pressure fluid being delivered by a pressure fluid pump 30 from a reservoir 31 through a conduit 32. The valve 33 communicates through a conduit 34 with the pressure fluid pump and conduits 35, 36 with working cylinders, not illustrated, pertaining to the disc clutch 4, 6. The likewise not illustrated valve spool of the multi-way valve 33 is controlled by magnetic coils 37, 38 as to its three possible control positions. These coils are, through lines 39, 40, connected to contacts 41$a$, 41$b$; 42$a$, 42$b$. The said contacts are arranged on a contact carrier 43 which is pivotally mounted on a shaft 44, which latter is stationarily journalled. Shaft 44 has mounted thereon a contact maker 45 which, through a rod 28$a$, is coupled to the control lever 28 and which comprises a contact 46, which through a line 49, is connected to a contact 47 of a two-pole reversing switch 48 operable by the control lever 13. Contact 46 is adapted by means of a contact bridge 50$a$ of said switch 48 selectively to be connected to a voltage source 51.

The reversing switch 48 comprises a contact bridge 50$b$ which is electrically connected to the voltage source 51 and which is adapted selectively to be connected to a contact 52 which, through a line 53, is connected to a contact bridge 54 of a reversing switch 55 adapted to be actuated manually by a pull knob, or the like. When the reversing group of group 2 is engaged by means of the control lever 13, it is possible, by means of the reversing switch 55, and contacts 56, 57 to connect the magnet coils 37, 38 directly with the voltage source 51 so that by actuating the reversing switch 55 it is possible to reverse the driving direction by reversing the group 2.

In addition to controlling the group 2 shiftable under load, by the reversing switch 55 it is also possible to control said group 2 by a manually operable lever 58. Lever 58 is non-rotatably connected to a control rod 59 which is shiftable about its longitudinal axis and which is universally movable in a joint 60, not illustrated in detail, and is coupled to contact carrier 43 through the intervention of a rod 61. The upper end of the control rod 59 is journalled in an arm 62 which is laterally arranged on control lever 28.

The contact carrier 43 is provided with two follower pins 63, 64 arranged at both sides of the contact maker 45. Furthermore, the contact maker 45 has its circumference provided with a notch 65 adapted to be engaged by the spring loaded arresting bolt, or the like, 66, 67, when the contact maker 45 occupies either one of its end positions.

OPERATION OF THE DEVICE OF FIG. 1

The operation of the device according to FIG. 1 is as follows: If it is assumed that a tractor with the described device is to be accelerated in forward direction from a standstill position with the device occupying its neutral position shown in the drawing, first the control lever 13 is pivoted in clockwise direction into the position V. Subsequently, the manually operable lever 58 is, for purposes of engaging the direct stage of the group 2 shifted in counter-clockwise direction into the indicated position N whereby the contact 42$b$ is pivoted to such an extent that it covers the contact 46 of the contact maker 45 and the follower pin 64 engages the contact maker 45 while furthermore the latching member 67 engages the notch 65. Through conductor 40, the magnet coil 38 is connected to the voltage source 51, and the multi-way valve is so controlled that the disc clutch 6 is actuated by pressure fluid from pump 30, and the direct control stage of group 2 is engaged. Subsequently, control lever 28 is shifted from the transverse paths forming the neutral position in conformity with the control diagram in clockwise direction until it reaches the end position of the control path for the first control stage. As a result thereof, the gear 21 of the lowermost control stage of the main control group 8 is, through the clutch member 27, coupled to the output shaft 22. When pivoting the control lever 28 to the end of the control path of the first control stage, it will be appreciated that by means of the contact maker 45 through the intervention of the follower pin 64 and while overcoming the arresting device 69, the contact carrier 43 is shifted in clockwise direction until the locking member 66 engages the notch 65. If the driver now engages the friction coupling again which was disengaged prior to the actuation of the control lever 28, the vehicle will be accelerated in the first control stage of the group 2 and the first control stage of main control group 8. It may be noted that the friction clutch is arranged between a non-illustrated driving engine and the transmission.

If the driver now wants to shift from the first lowermost control stage of the main control group 8 to the adjacent second control stage, he will first shift the control lever 28 in counter-clockwise direction by a partial stroke which amounts to about one-third of the stroke from the neutral position. During this shifting of control lever 28, the contact carrier 43 maintains its position with regard to the arresting device 68, and the clutch part 27 remains engaged. In view of this shifting operation, the contact 46 of the contact maker 45 is connected to the contact 41$b$ so that the magnet coil 37 is electrically connected to the voltage source 51 through the conductor 39. As a result thereof, the disc clutch 6 is disengaged and the disc clutch 4 is engaged whereby the geared stage of group 2 is engaged. Consequently, in conformity with the method according to the invention, when initiating the shifting operation from the lowermost control stage of the main group to the adjacent second control stage, the step of progression of said second stage is automatically subdivided by the geared stage of the group shiftable under load. Consequently, the vehicle will now in the lowermost control stage of the main control group be accelerated while simultaneously the geared control stage of group 2 is engaged. When, thereupon, the driver shifts the control lever 28 from its last mentioned position through the transverse path to the end position of the control path of the second control stage, first, the first control stage of the main control group 8 is disengaged and through clutch 26, the gear 19 is connected to the output shaft whereby the second control stage of the main control group is engaged. The shifting of the control lever 28 to the end of the control path for the second control stage brings about that the contact maker 45, and, through the intervention of follower pin 63, the contact carrier 43 are with overlapping contacts 46 and 42a pivoted in counter-clockwise direction to such an extent that the locking member 67 of the arresting device 69 engages the notch 65. As a result thereof, the disc clutch 4 of group 2 is disengaged and the disc clutch 6 is engaged so that the direct control stage of the group 2 becomes effective. If the driver now again engages the friction clutch which was disengaged prior to the shifting of control lever 28, the vehicle will move in the second control stage of the main control group while the shiftable stage of group 2 is directly engaged.

It will thus be appreciated that according to the present invention after subdividing a step of progression of the main control group 8, the automatically interposed control stage of group 2 is automatically again made ineffective. In view of the connection of the control lever 28 with the control rod 59 and in view of the connection of the contact carrier 43 with the control rod 59, the actuating lever 58 pertaining to rod 59 is automatically returned into neutral position N.

When shifting from the second control stage to the adjacent third control stage of the main control group 8, prior to disengaging the gear 19 from the output shaft 22 during the shifting of the control lever 28 and while the contact carrier 43 is locked, the contact 46 is connected to the contact 41a. In this way, the disc clutch 4 is engaged and the geared control stage of group 2 is made effective. If thereupon the control lever 28 is shifted in clockwise direction beyond its neutral position to the end of the control path for the third control stage of the main control group 8, clutch 26 connects the gear 17 of the third control stage to the output shaft 22. The contact carrier 43 is, by means of the contact maker 45, and the follower pin 64 of the contact carrier 43 shifted in clockwise direction until the locking member 66 of the arresting device 68 engages the notch 65. In this position, the contact 46 covers the contact 42b whereby the disc clutch 6 is engaged and the direct control stage of the control group 2 is made effective.

The downward shifting from one control stage to an adjacent control stage of the main control group 8 is effected accordingly, but in a reverse sense as the upward shifting. For the downward shifting, however, it should be borne in mind that prior to the initiation of a shifting operation, the actuating lever 58 is, in clockwise direction, shifted into the position H to such an extent that the contact carrier 43 with its notch 65 is located opposite to the arresting device 68 and the locking member 66 engages the notch 65. With a subsequent control movement of the main control lever 28, immediately following the engagement of the adjacent lower control stage by the contact 41b, the geared control stage of group 2 is engaged and only after further shifting through contact 42b, the direct control stage of group 2 is again engaged.

Figures 2, 3:
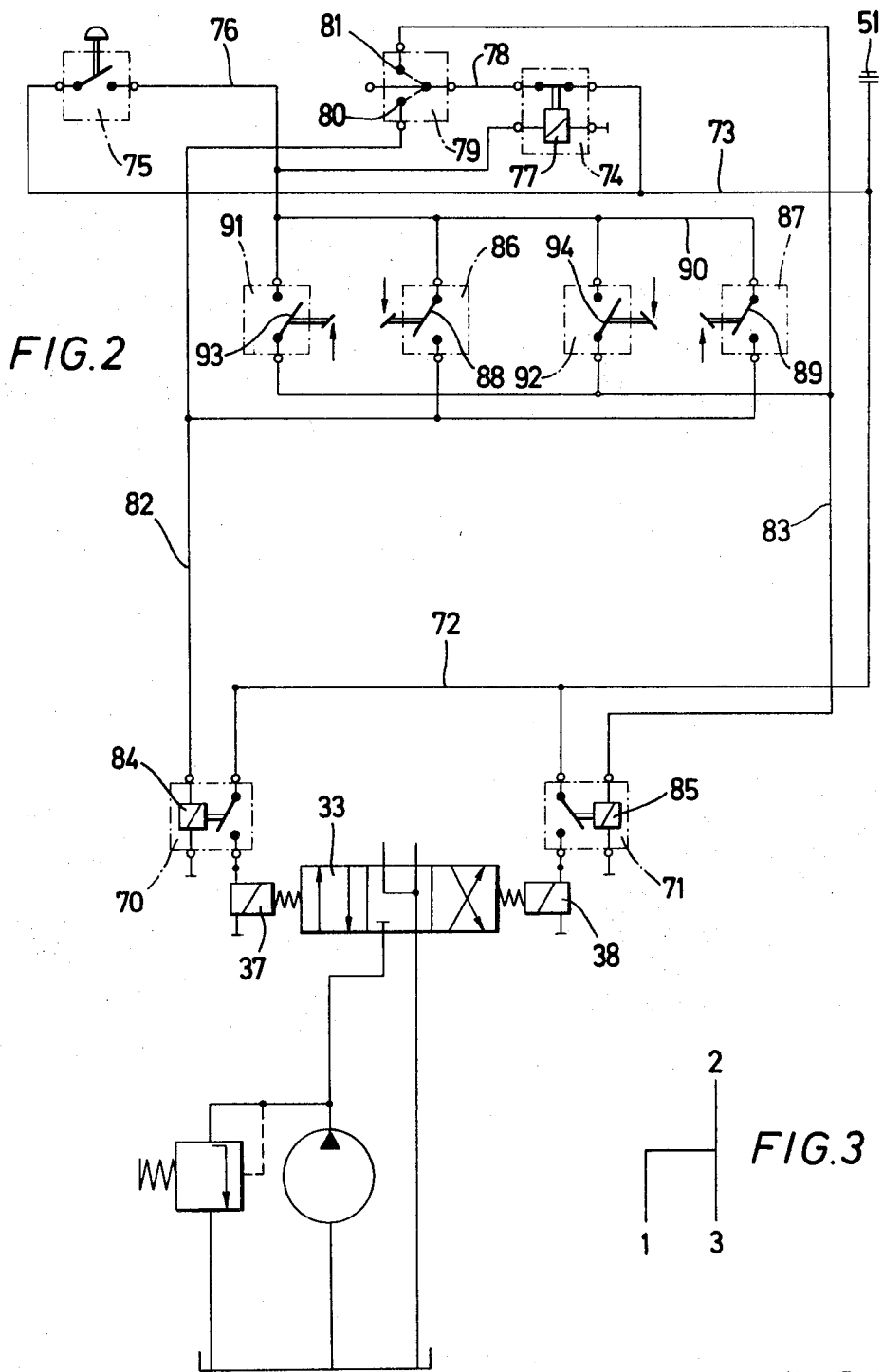
FIG. 2 shows a further embodiment of the invention, in which the control group shiftable under load is controlled directly by electric control operations which are actuated by the shift lever of the main shiftable group.
FIG. 3 illustrates the diagram of a control coulisse for use in connection with the arrangement of FIG. 2.

For the electrohydraulic device illustrated in FIG. 2, there is assumed a change gear transmission according to FIG. 1. The control of the fluid pressure operable disc clutch 4, 6 is likewise effected by a multi-way valve 33 which is likewise actuated by magnet coils 37 and 38. The magnet coils 37 and 38 are, through relays 70, 71, and a conductor 72 connected to the voltage source 51. Also connected to the voltage source 51 through a conductor 73 is a relay 74 and a feeler switch 75 which is arranged on the free end of a non-illustrated control lever for the main control group. The control lever is to be guided in a control path illustrated in FIG. 3. The magnet coil 77 of relay 74 is, through a conductor 76, so connected to the feeler switch 75 that the engaged relay 74 separates the voltage source 51 from manual reversing switch 79 which through a conductor 78 is connected to relay 74. The reversing switch 79 which serves the direct reversing of the group 2 has contacts 80, 81 which, through conductors 82, 83 are connected to the magnet coils 84, 85 of relay 70, 71. Also connected to conductor 82 are two one-pole switches 86, 87, the contact bridges 88, 89 of which, are spring loaded so as to urge the same into shut-off condition and are, through a conductor 90, connected to the conductor 76. Conductor 83 has likewise connected thereto two one-pole switches 91, 92, the contact bridges 93, 94 of which are spring urged to move in a switching-off direction and are adapted to be connected to contacts electrically connected to conductor 90. The contact bridges of the switches 88 and 93 are operatively connected to the control lever of main control group 8 in such a way that in response to the control lever moving out of its neutral position according to FIG. 3, into the vertical control path for maintaining the first control stage are alternately actuated after the clutch part 27 has been engaged.

On the other hand, the contact bridges 89 and 94 of the switches 87 and 92 are so operatively connected to the control lever of the main control group 8 that in response to the movement of the control lever out of the transverse path into the vertical path for the engagement of the second stage, said contact bridges and switches are alternately actuated following the engagement of the jaw clutch 26.

OPERATION OF THE DEVICE OF FIGS. 2 AND 3

The operation of the device according to FIGS. 2 and 3 is as follows: If a tractor with a device according to FIG. 2 in the first control stage is to be accelerated from its standstill position, the main control lever is pivoted from its neutral position into the vertical control path of the first control stage and by means of the clutch part 27 and the gear 21 of the lower control stage of the main control group is coupled to the output shaft 22. When moving the control lever into the control path of the first control stage, the feeler switch 75 arranged thereon is likewise actuated whereby the voltage source 51 is connected to the conductor 76 and by means of the relay 74 the reversing switch 79 is separated from the voltage source 51. Furthermore, when shifting the control lever from its neutral position into the control path of the first control stage, the switch 91 is closed and switch 86 is opened. The closing of the switch 91 brings about that the voltage source 51 is connected to the control circuit of relay 71. As a result thereof, the voltage source 51 is directly connected to the magnet coil 38, and the lower control stage of group 2 is engaged. If it is now desired to switch from the first control stage to the second control stage of the main control group 8, the control lever is moved from the control path for the first control stage in the direction of the neutral position. Prior to the disengagement of the clutch part 27, the switch 86 is, by means of the control lever, actuated in a switch-off sense and the switch 91 is, through contact bridge 93, engaged whereby the geared control stage of group 2 is made effective. Thus, according to the invention, prior to the engagement of the adjacent second stage of the main control group, the interposed geared control group of group 2 is engaged for subdividing the step of progression. If, now, the control lever is moved beyond its neutral position into the vertical portion of the control path for engaging the second control stage of the main control group, gear 19 for the second control stage of the main control group is by the jaw clutch 26 coupled to the output shaft 22. When the feeler switch 75 is closed, the switch 92 is closed and thus the lower control stage of group 2 is made effective. If it is now desired to switch from this control stage to the third lower control stage of the transmission, the control lever is moved from the engaged position of the second control stage of the main control group by a partial stroke during which the gear 19 still remains in operative connection with the output shaft 22. However, the switch 92 is opened and the switch 87 is closed whereby in conformity with the invention the geared control stage of group 2 is automatically engaged for subdividing the step of progression.

It is, of course, to be understood that the present invention is, by no means, limited to the showing in the drawings, but also comprises any modifications within the scope of the appended claims.

What is claimed is:

1. The method of controlling a multi-stage change gear transmission with a main control group and a control group which is shiftable under load and adapted to precede as well as to follow the main control group and which has two forward stages with a step of progression which is considerably less, for instance half, than the step of progression in the main control group, which comprises the steps of: when initiating a shifting operation from one control stage to an adjacent control stage of the main control group by means of a control member of the main control group automatically subdividing the step of progression of said main control group by a control step of the control group shiftable under load, and when shifting further to the next control stage of the main control group making ineffective the interposed control stage.

2. A method according to claim 1, in which when shifting from one control stage to an adjacent control stage of the main control group there is moving of the actuating member of the control group shiftable under load automatically into control position for subdividing the step of progression of the main control step, and when shifting further from the intermediate interposed control stage to the adjacent control stage of the main control group, automatically making ineffective the interposed control stage.

3. A method according to claim 2, in which when shifting from one control stage to an adjacent control stage of the main control group there is moving of the actuating member of the control group shiftable under load automatically by the actuating member of the main control group into control position for subdividing the step of progression of the main control group, and when shifting from said intermediate interposed control stage to the adjacent control stage of the main control group there is moving of the actuating member of the control group shiftable under load by means of the actuating member of the main control group automatically into the position occupied thereby at the start of the control operation.

4. A multiple speed range transmission for multi-stage-change-gear-shift operation with a main control group and a control group which is shiftable under load and adapted to precede as well as to follow the main control group and which has two forward stages with a step of progression which is considerably less, for instance half, than the step of progression in the main control group while having an input shaft and an output shaft, a plurality of gear sets interposed between said input shaft and output shaft, means for making said gear sets selectively effective for coupling said shafts together at respective drive ratios, a pair of power flow pressure means in parallel with each other and in serial arrangement with said gear sets and having respective drive ratios, a friction clutch operative in conjunction with each power flow pressure means, means for making said friction clutches selectively effective and ineffective, and an actuating member of the main control group shiftable so that when initiating a shifting operation from one control stage to an adjacent control stage of the main control group, said actuating member of the main control group automatically subdivides the step of progression of the main control group by a control step of the control group shiftable under load, and when shifting further to the next control stage of the main control group the interposed control stage is made ineffective.

5. A multiple speed range transmission according to claim 4, in which each friction clutch includes fluid operable actuating means, a source of fluid pressure, a shiftable multi-way control valve connected between said source of pressure and said fluid operable actuating means, the control group shiftable under load including a mechanically engageable additional reversing group while the control of a change in the driving direction is effected by said multi-way control valve.

6. A multiple speed range transmission according to claim 5, which includes a main control lever connected in controlling relation to said gear sets and shiftable for making said gear sets selectively effective, solenoid means associated with said control valve to effect the shifting thereof, a source of voltage, and circuit means connecting said source of voltage to said solenoids including switch means operated by shifting of said main control lever.

7. A multiple speed range transmission according to claim 6, in which said switch means includes a rotatably mounted plate having circumferentially spaced contact elements thereon and a contact arm tiltable on the axis of said plate having contact means to engage said contact elements and connected to said main control lever to be tilted thereby when said main control lever is shifted.

8. A multiple speed range transmission according to claim 7, which includes a control rod connected to said main control lever so as to be moveable therewith, said control rod being rotatable about an axis perpendicular to the axis about which said main control lever is shiftable, and means coupling said contact plate to said control rod.

9. A multiple speed range transmission according to claim 8, in which said contact plate has abutment elements engageable by said contact arm to limit the relative movement of said contact arm relative to said contact plate, and detent means for releasably retaining said contact plate in each of two extreme tilted positions thereof.

10. A multiple speed range transmission according to claim 6, in which one of said power flow paths includes reversing means, a shift lever operatively connected to said reversing means, and a reversing switch in said circuit means and operated by said shift lever.

11. A multiple speed range transmission according to claim 10, in which said reversing switch connects said source of voltage to said switch means when said shift lever is in forward position, a manual switch connected to said solenoids, and said reversing switch connecting said source of voltage to said manual switch when said shift lever is in reverse position.

12. A multiple speed range transmission according to claim 6, which includes a relay controlling the energization of each said solenoid, and said switch means includes a pair of control switches connected in controlling relation to each said relay.

13. A multiple speed range transmission according to claim 12, in which each control switch pertaining to one relay is grouped with a control switch pertaining to the other relay, the control switches of each group alternately opening and closing as said main control lever is shifted.

14. A multiple speed range transmission according to claim 13, which includes a reversing switch connected to said relays for the selective energization thereof, a further relay for making said reversing switch selectively effective and ineffective, and a manual switch controlling said further relay.

15. A multiple speed range transmission according to claim 14, in which said manual switch is connected to make said control switches ineffective simultaneously with making said reversing switch effective via said further relay and vice versa.

16. A multiple speed range transmission according to claim 15, in which said manual switch is mounted on said main control lever.

* * * * *

UNITED STATES PATENT OFFICE
CERTIFICATE OF CORRECTION

Patent No. 3,682,019          Dated August 8, 1972

Inventor(s) MANFRED HOYER ET AL

It is certified that error appears in the above-identified patent and that said Letters Patent are hereby corrected as shown below:

On the cover sheet [72] the name of the third inventor should read -- JOHANN URBAN --; [73] the name of the assignee should read -- KLÖCKNER-HUMBOLDT-DEUTZ AKTIENGESELLSCHAFT --.

Signed and sealed this 8th day of May 1973.

(SEAL)
Attest:

EDWARD M. FLETCHER, JR.　　　　　　　ROBERT GOTTSCHALK
Attesting Officer　　　　　　　　　　　Commissioner of Patents